W. J. MacINTOSH.
PROCESS OF MAKING COMBS.
APPLICATION FILED NOV. 24, 1911.
1,095,584.
Patented May 5, 1914.
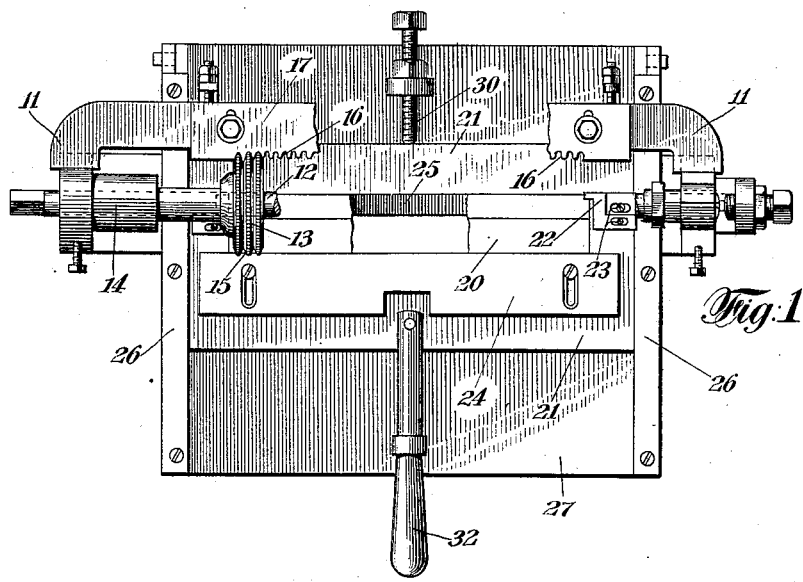
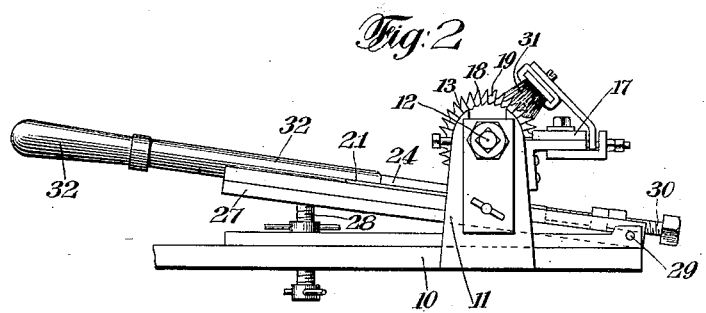
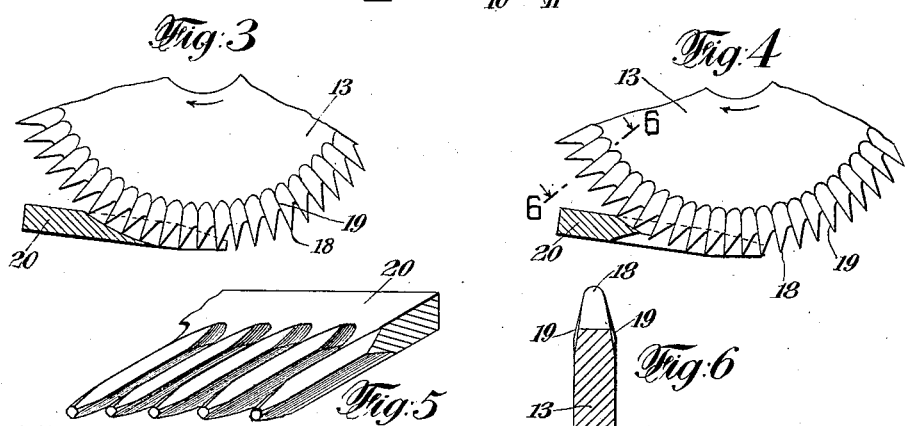
Witnesses:
John E. Prager
A. Worden Gibbs
Inventor
William J. MacIntosh
By his Attorney
Fredk. F. Schuetz
COLUMBIA PLANOGRAPH CO., WASHINGTON, D. C.

UNITED STATES PATENT OFFICE.

WILLIAM J. MacINTOSH, OF ARLINGTON, NEW JERSEY, ASSIGNOR OF ONE-HALF TO HENRY SCHLOSS, OF NEW YORK, N. Y.

PROCESS OF MAKING COMBS.

1,095,584.  Specification of Letters Patent.  Patented May 5, 1914.

Application filed November 24, 1911. Serial No. 662,156.

*To all whom it may concern:*

Be it known that I, WILLIAM J. MAC-INTOSH, a citizen of the United States, and a resident of Arlington, in the county of Hudson and State of New Jersey, have invented certain new and useful Improvements in Processes of Making Combs, of which the following is a specification.

The invention relates to a method of producing side-combs, back combs and dressing combs composed of any suitable material.

It has for its object to combine and to effect by machine the several operations which are usually performed separately and by hand, the improved process of producing from a blank, a comb finished in all respects with the exception of rubbing and polishing, which operations are effected in the usual manner. The method comprehends simultaneously sawing the teeth spaces into the blank, suitably pointing the teeth thus formed, grailing the same and properly bottoming the roots of the teeth, and in such a manner that excessive heating of the teeth and springing of the same is avoided during the operations aforesaid. The teeth of the completed comb are, by the improved process suitably pointed and grailed, the grailing extending to the bottom of the teeth and rounding smoothly off to prevent any cutting action in using the comb.

The nature of the invention will be best understood when described in connection with the accompanying drawings, in which—

Figure 1 is a plan view of a machine which may be employed to carry out the improved process, a portion of the gang of grailing saws, and of the guide and sharpening plate for the same, being broken away. Fig. 2 is a side elevation of the said machine. Figs. 3 and 4 are detail views illustrating the improved method of producing the combs. Fig. 5 is a perspective view of a portion of a finished comb. Fig. 6 is a detail taken on the line 6—6, Fig. 4, of one of the cutting teeth of the gang of grails employed.

Similar characters of reference designate corresponding parts throughout the several views.

Referring now to the drawings 10 designates a suitable bed plate from which extend upwardly standards 11 serving to retain a shaft 12 upon which are mounted a plurality of adjacent circular saws or grails 13. The gang of grails 13 is adapted to rotate with the shaft 12, the rotation of which is effected through a pulley 14 thereon and driven in any suitable manner. The grails 13 are arranged to fit tightly one to the other, and to form between their cutting ends V-shaped recesses 15, which are arranged to be engaged by the teeth 16 of a guide plate 17 adjustably secured to the standards 11. This plate may serve, also, to maintain the cutting edges of the grails sharp by temporarily reversing the direction of rotation of the same. The grails are shown in detail in Figs. 3, 4 and 6 and are provided with tapering, rounded peripheral cutting teeth 18 and with lateral teeth 19, the former serving to form the teeth in the comb blank and to bottom the same, while the latter serve to effect the grailing of these teeth. It will be evident that the distance that the grails may enter the blank is limited and that the deeper the entrance into said blank the wider will be the cut. The clearance between the lateral cutting teeth serves to permit the shaving from the blank to pass therethrough and out beyond the saws. This materially reduces the tendency to heat and thereby to ignite the material, which is generally of a highly inflammable nature.

In carrying out the improved process, the blank 20 is secured in any suitable manner to a slide 21. For example, the ends of the blank may be held down by fingers 22 arranged to fit over the blank and slidably secured to the slide 21 by means of screws 23. The blank is preferably backed by guide plate 24 adjustably secured to the slide 21, and its forward end rests upon a resilient strip 25 of rubber or other suitable material. This provides a cushion for the points of the partly cut teeth to rest upon to prevent springing of the same when entering under the grails. It serves, furthermore, to elevate the forward edge of the blank for the purpose of pointing the teeth, as will hereinafter be set forth. The slide 21 is arranged to be reciprocated within ways 26 of a slide plate 27, resting upon an adjusting screw 28 which extends through the bed plate 10 and whereby the angle of said plate 27 is fixed, the said plate being pivoted to the bed plate at 29. To limit the inward movement of the slide 21 an adjustable stop 30 is provided. An oil brush 31, Fig. 2, is arranged to bear upon the gang of grails and supply oil thereto to provide a smoother finish of the comb teeth.

In carrying out the process, the comb blank 20, whose forward portion is generally beveled as shown, is presented tangentially to the teeth of the grails, which grails extend the entire length of the blank to be cut, by moving the slide 21 toward the said gang of grails by means of a handle 32. The teeth of said grails cut up into the upper surface of the blank 20 presented thereto; and the said blank being held between the periphery of the grails and the upper face of the slide, is thus firmly secured during the cutting action. The blank is moved inwardly to saw the teeth of a sufficient length, the same being determined by the position of the stop 30 against which the slide strikes. The depth of cut into the surface must be at least one-half of the thickness of the blank and may be such as to pass entirely through the blank at the forward portion. After one surface has been thus sawed, the blank is withdrawn and reversed and the other surface presented to the gang of grails in a similar manner. The tooth then presents the appearance as set forth in Figs. 4 and 5, having the bottom beveled as well as the sides thereof, the latter beveling, or grailing, being effected by the lateral teeth 19 of the said circular saws. To also point the front ends of the teeth at their sides, the forward end of the blank is arranged to be slightly elevated, as by means of the resilient strip 25. This will cause the tapering teeth of the saws to enter deeper into the forward portion of the blank than at the rear portion thereof and thereby cause more material to be removed at the ends of the teeth, providing a point tapering at the side. The top and bottom taper of the points is provided by employing a blank having a properly beveled upper and lower surface.

I claim:—

1. The herein described process for simultaneously dividing and completely shaping the teeth of a comb blank which consists in presenting one face of the blank in such a direction leading from the points to the roots of the teeth to a gang of circular saws so shaped as to half way divide the teeth, grail the edges and bottom of the teeth on one side of the blank and then withdrawing the blank and presenting the other face similarly to such saws.

2. The herein described process for simultaneously dividing and completely shaping the teeth of a comb blank which consists in maintaining the forward end of the blank elevated and presenting one face thereof in such a direction leading from the points to the roots of the teeth to a gang of circular saws so shaped as to half way divide the teeth, grail the edges and bottom of the teeth and point the same on one side of the blank and then withdrawing the blank and presenting the other face similarly to such saws.

Signed at New York in the county of New York and State of New York this 20th day of November A. D. 1911.

WILLIAM J. MacINTOSH.

Witnesses:
NORMAN F. SCHLOSS,
FRED'K F. SCHUETZ.

Copies of this patent may be obtained for five cents each, by addressing the "Commissioner of Patents, Washington, D. C."